T. A. C. BOTH.
MECHANICAL MOVEMENT AND ELECTRIC LIGHT SOCKET.
APPLICATION FILED JUNE 2, 1911.
1,007,058.
Patented Oct. 31, 1911.
3 SHEETS—SHEET 1.
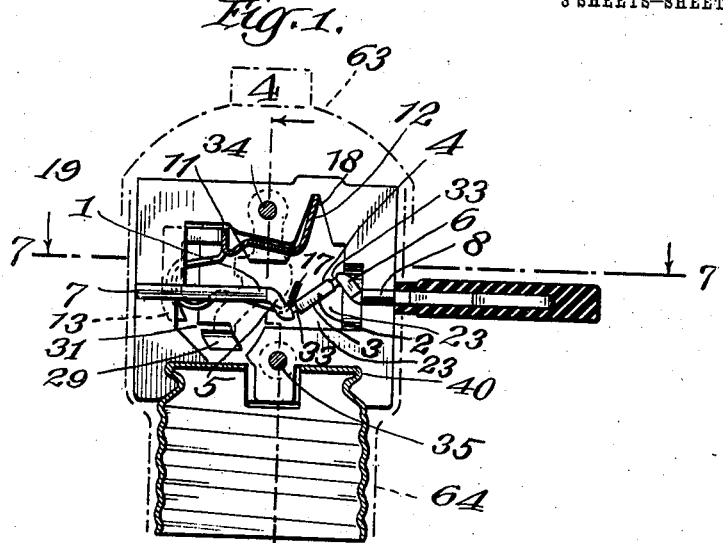
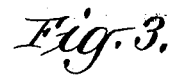
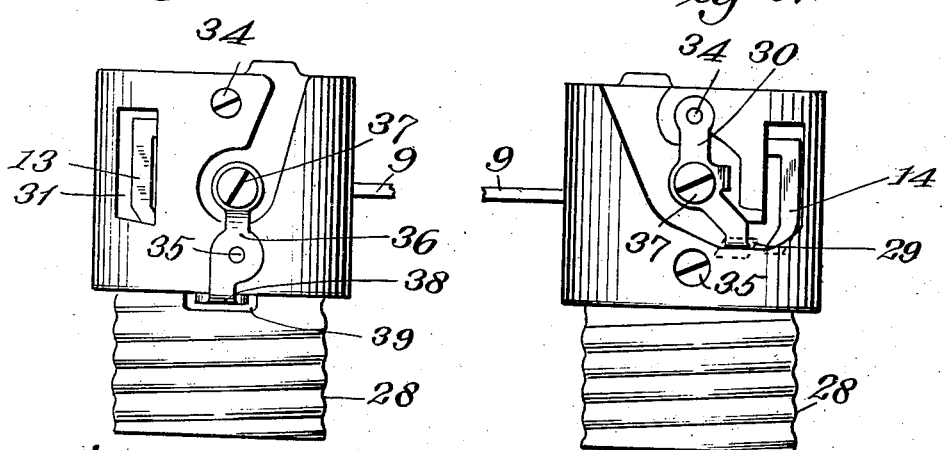
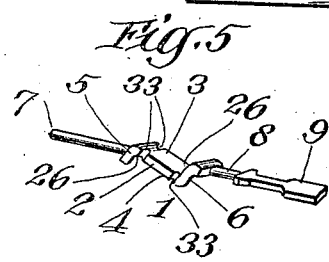
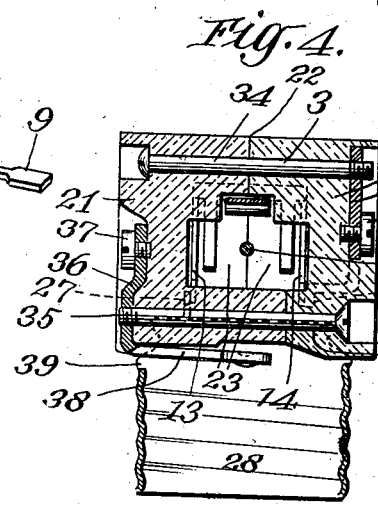
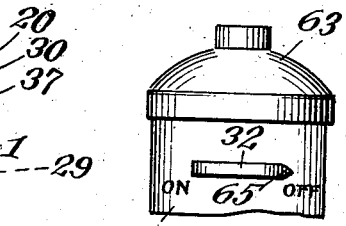
WITNESSES
H. Crocheron
R. Menk
INVENTOR
Tonyes A. C. Both
BY
Alan M. Johnson
ATTORNEY T. A. C. BOTH.
MECHANICAL MOVEMENT AND ELECTRIC LIGHT SOCKET.
APPLICATION FILED JUNE 2, 1911.
1,007,058.
Patented Oct. 31, 1911.
3 SHEETS—SHEET 2.
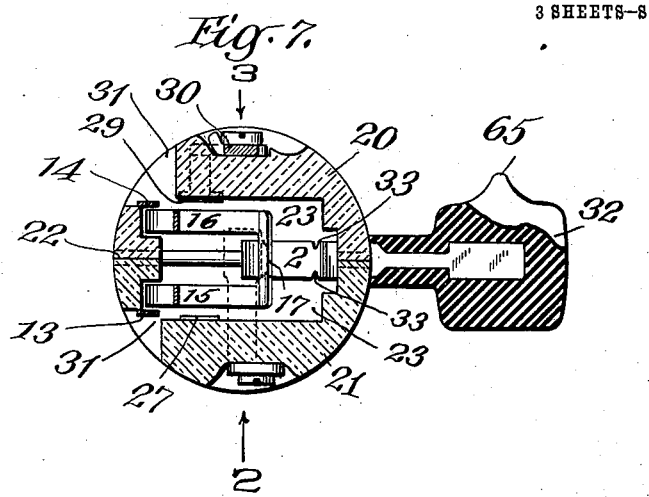
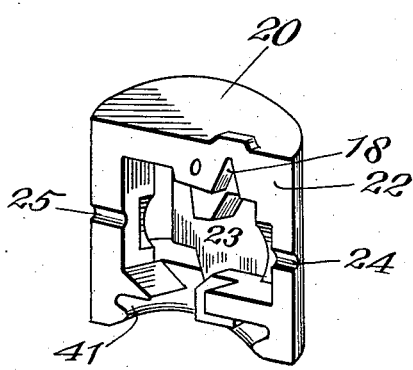
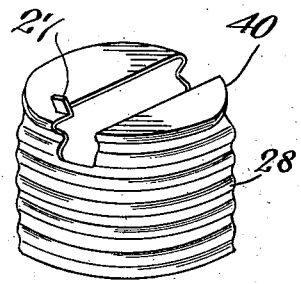
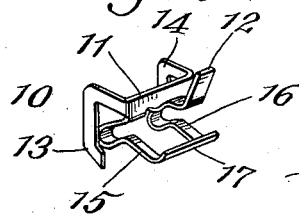
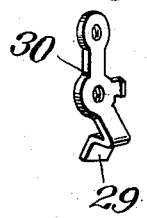
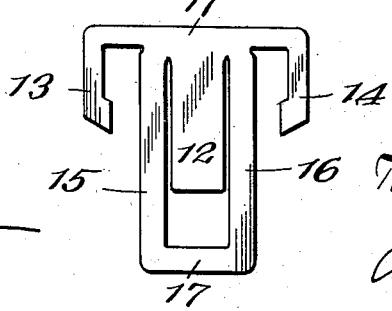
WITNESSES
N. Brockeron
R. Menk
INVENTOR
Tonjes A.C. Both
BY
Alan M Johnson
ATTORNEY T. A. C. BOTH.
MECHANICAL MOVEMENT AND ELECTRIC LIGHT SOCKET.
APPLICATION FILED JUNE 2, 1911.
1,007,058.
Patented Oct. 31, 1911.
3 SHEETS—SHEET 3.
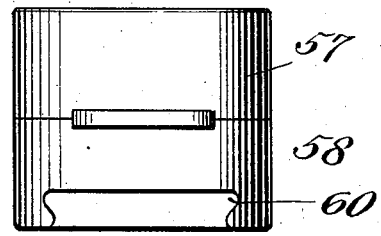
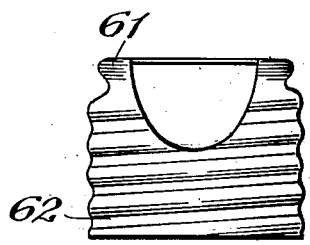
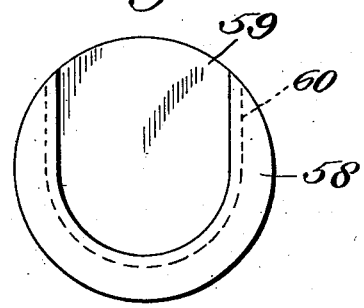
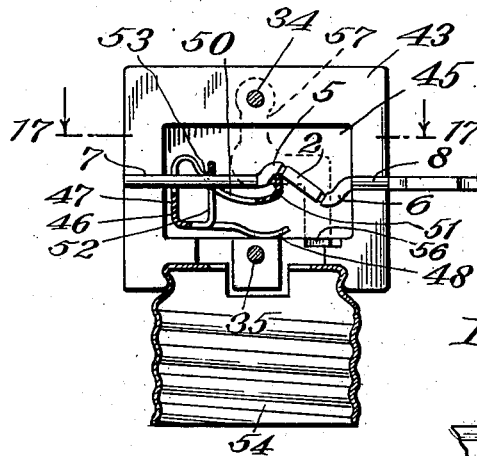
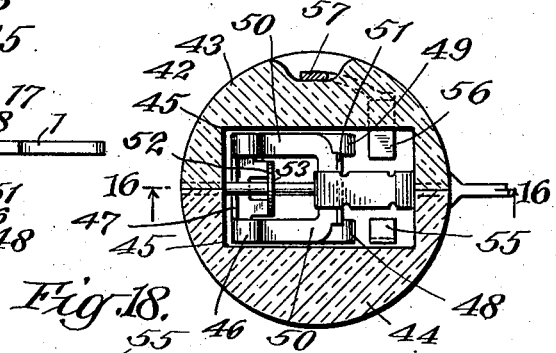
WITNESSES
H. Crocheron
R. Menk
INVENTOR
Tonjes A.C. Both
BY
Alan M. Johnson
ATTORNEY

UNITED STATES PATENT OFFICE.

TONJES AUGUST CARL BOTH, OF NEW YORK, N. Y., ASSIGNOR TO IDA S. ROSENHEIM, OF NEW YORK, N. Y.

MECHANICAL MOVEMENT AND ELECTRIC-LIGHT SOCKET.

1,007,058.

Specification of Letters Patent.   Patented Oct. 31, 1911.

Application filed June 2, 1911. Serial No. 630,876.

*To all whom it may concern:*

Be it known that I, TONJES AUGUST CARL BOTH, a citizen of the United States, and a resident of New York, in the county of New York and State of New York, have invented certain new and useful Improvements in Mechanical Movements and Electric-Light Sockets, of which the following is a specification, taken in connection with the accompanying drawings, which form a part of the same.

This invention relates to mechanical movements adapted for universal application.

It is particularly adapted to make a quick make and a quick break between electrical contacts on the rotation, in either direction, of the driving member.

My invention further relates to electric light sockets and to details of construction of both the mechanical movement and the electric light socket, which will be more fully hereinafter described in the specification and pointed out in the claims.

In the accompanying drawings showing illustrative embodiments of my invention and in which the same reference numerals refer to similar parts in the several figures,—Figure 1 is a central vertical section through my improved electric light socket equipped with my mechanical movement as a switch mechanism; Fig. 2 is a side elevation of my electric light socket looking in the direction of the arrow 2 in Fig. 7; Fig. 3 is a side elevation of an electric light socket looking in the direction of the arrow No. 3 in Fig. 7; Fig. 4 is a transverse vertical section on the line 4—4 of Fig. 1 looking in the direction of the arrows; Fig. 5 is a perspective view of the driving member; Fig. 6 is a fragmentary side elevation of the socket, on a somewhat reduced scale, showing the indicating button; Fig. 7 is a horizontal section substantially on the line 7—7 of Fig. 1; Fig. 8 is a perspective view of one of the insulating base members; Fig. 9 is a perspective view of the screw shell; Fig. 10 is a perspective view of the resilient driven member of the mechanical movement; Fig. 11 is a plan view of the blank from which the resilient driven member is formed; Fig. 12 is a perspective view of one of the binding posts; Fig. 13 is a side elevation of a modification; Fig. 14 is a side elevation of a screw shell to coöperate with the modified form of insulating base shown in Fig. 13; Fig. 15 is an inverted plan view of the lower insulating member shown in Fig. 13; Fig. 16 is a central vertical section substantially on the line 16—16 of Fig. 17 of a modified construction in which the resilient driven member slides laterally to the longitudinal axis of the socket; Fig. 17 is a horizontal section substantially on the line 17—17 of Fig. 16; Fig. 18 is a fragmentary side elevation of the screw shell used in this form of construction.

In the illustrative embodiments of my invention shown in the drawing, 1, Figs. 1 and 5, is the driving member provided with a substantially Z-shaped cam 2, Fig. 5, having substantially two parallel surfaces 3 and 4 arranged at an angle to the longitudinal axis of the driving member 1 and extending between the head 5 and the base 6 of the substantially Z-shaped cam. The head 5 and base 6 are in effect opposed cranks which are connected by the inclined member having the parallel surfaces 3 and 4. This driving member 1 is also provided with an extension 9, Fig. 5, and with substantially cylindrical portions 7 and 8 to coöperate with suitable bearings.

To directly coöperate with the driving member 1, I provide a resilient driven member which may be formed in various ways. It may for example as in Fig. 10 be a resilient driven member 10 having a body member 11 provided with a pivoting arm 12 and with operating arms 13 and 14. Connected to the body member are arms 15 and 16 connected together by means of a cross arm 17. This cross arm 17 directly coöperates with the Z-shaped cam 2 of the driving member 1, Figs. 1 and 5. If the pivoting arm 12 of the driven member 10 be held in any suitable manner, as in the recess 18 in a support, Fig. 1, it is clear that upon the rotation of the driving member 1, in either direction, one of the opposed cranks on the driving member 1, the head 5 or the base 6, will cause the cross arm 17 to approach the pivoting arm 12 and in this manner store up energy in the driven member 10 until such time as either the parallel surfaces 3 or 4, as the case may be, is brought directly beneath the cross arm 17 when the resilient driven member will instantly, with a quick snap, jump from one crank and become seated in the crotch 26 of the other crank, but in so doing it will cause the entire resilient driven member to move with a quick snap. This may be taken advantage of wherever such such a simple and positive mechanical movement is desirable. I have shown it for purposes of illustration used as a switch mechanism in an electric light socket 19, Fig. 1. This socket is also a portion of my invention. It consists essentially of a plurality of insulating base members, two being preferably used, 20 and 21, having a meeting surface 22 extending substantially longitudinally of the socket 19. Each of these insulating base members 20 and 21 is provided with a recess 23 for the reception of a switch mechanism which is preferably my mechanical movement. In the face of one or both of the insulating base members 20 and 21 I form recesses 24 and 25, Fig. 8, to form a bearing for the cylindrical portions 8 and 7 of the driving member 1. By preferably forming the insulating base in two parts and arranging them face to face they can be easily molded out of porcelain, or other insulating material at minimum expense; the bearings for the driving member or key being preferably molded at the same time. They can also be held together without using a bracket or brackets as is customary when upper and lower insulating parts are used. In one or both of the insulating base members I preferably form a recess 18 to receive the pivoting arm 12 of the driven member 10.

When my mechanical movement is used as a switch mechanism in a socket, the arms 13 and 14 become electrical contacts to coöperate, respectively, with the contact 27, carried by the screw shell or side contact 28, and with the contact 29 carried by the binding post 30, Figs. 1, 7 and 4.

To permit freer movement of the driven member I preferably, though not necessarily, provide the different insulating base members 20 and 21 with slots 31, 31 which will permit the contact arms 13 and 14 on the driven member 10 to rest at some little distance from the contacts 27 and 29 when the switch is turned to its inoperative position. These slots may be variously formed but I preferably form them simply by omitting a portion of the exterior surface of each of the insulating base members 20 and 21. Upon rotating the key or button 32 in either direction the cross arm 17 of the resilient contact driven member 10 will be first pressed by one of the opposed cranks 5 or 6 toward the pivoting arm 12 to store up energy in the driven member and then, as soon as either the inclined surface 3 or 4, as the case may be, is brought beneath the cross arm 17 it will instantly with, a quick and positive snap, move down one or the other inclined surface 3 or 4 of the Z-shaped member 2 until it rests in the corresponding crotch 26 of the other crank. In making this movement, however, the contacts 13 and 14 are either brought into or separated from their coöperating contacts 27 and 29, respectively, with a quick and positive movement to make either a quick make or a quick break of the current as the case may be. To hold the cross arm 17 until the maximum energy has been stored up in the driven member 10 and until the inclined surfaces 3 or 4 are brought directly beneath the cross arm 17, I preferably provide the Z-shaped member with recesses 33, 33.

It will be noted that in my present invention the driven member of my mechanical movement is also the resilient member and that no additional element, other than the driving member, is needed to operate the driven member, but on the contrary simply by rotating the driving member 1, in either direction, will, without the aid of any other member, cause the driven member to perform its desired function.

The driven member which I have illustrated in Fig. 10 I preferably form out of sheet metal at one stamping making a blank shown in Fig. 11 from which the arms can readily be bent into the position shown in Fig. 10; or the entire driven member may be stamped and bent out of sheet metal in one operation. The manner of manufacturing the driven member, however, does not form any part of my present invention as it may be variously made.

Another portion of my invention comprises the driving member 1, Fig. 5, which is preferably formed out of sheet metal, the entire driving member being preferably formed at one stamping, the Z-shaped cam being bent or crimped in the driving member at that time. It is to be understood of course that it may be made in other ways as by a series of stampings or otherwise.

Another portion of my invention comprises the electric light socket and the means of attaching the different members forming the insulating base together and at the same time connecting the binding posts to the socket. A still further portion of my invention includes securing the screw shell to the insulating base by the aid of the same securing means which are used to secure the different members of the base together.

In the present practice it is customary to secure the binding posts to the insulating base by one set of screws or securing means and to have additional screws or other securing means to secure the two or more portions of the base together. This entails additional cost for the additional securing means and considerable additional expense in the labor of assembling the socket. By my invention I use simply two screws 34 and 35, Figs. 1 and 4, arranged transversely to the longitudinal axis of the socket, and preferably above and below the recess 23 in which my switch mechanism is mounted. The screw 34 has its head countersunk in the insulating base member 21 and coöperates with and holds the binding plate 30 to the other base member 20. The other screw 35 has its head countersunk in the insulating base member 20 and holds the binding post 36 to the insulating base member 21. The binding posts 30 and 36 carry the usual binding screws 37, 37. The binding post 36 is preferably, though not necessarily, formed integral with the center contact 38 which passes through an opening 39 in the screw shell 28. It is, therefore, seen that by my invention the very act of securing the different binding posts 30 and 36 to the insulating base 19 serves, at the same time, to secure the different sections of the insulating base together, and avoids the necessity of using at least one or more additional screws for holding these sections to each other. Usually two such additional screws are used which not only entails additional expense but also the additional labor in mounting them and in covering over their ends with wax as is customary.

In addition to securing the different portions of the insulating base together, two being preferably used, by the same means which secure the different binding posts to the base, I also at the same time and at the same operation secure the shell to the insulating base. This may be done in various ways. I preferably provide the screw shell 28 with a locking surface as a bead 40 and provide each of the insulating base members 20 and 21 with a coöperating locking surface as a groove 41. It will therefore be seen that by my invention, after the switch mechanism has been positioned in one of the insulating base members 20 or 21, substantially one half of the bead 40 of the screw shell 28 can then be made to register with a locking groove 41 in that insulating base member, the other insulating base member can then be brought into coöperation with the first member to inclose the switch mechanism and at the same time bring its locking groove 41 into register with substantially the other half of the bead 40 of the screw shell 28; then by locating the binding posts 30 and 36 in their proper recesses, the entire mechanism will be secured together, the screw shell to the base, the different sections of the base together, and the binding posts to the base by the two screws 34 and 35. In my improved socket the screws which are ordinarily used to secure the shell to the insulating base are omitted, saving their cost and also giving greater room in the interior of the socket for the switch mechanism.

By my invention it is not necessary that the resilient driven member rock upon a support as it does for example in Fig. 1. The resilient driven member, instead of rocking, may readily be arranged to slide laterally to the longitudinal axis of the socket as shown for example in Fig. 16. In this figure I have shown the insulating base 42 formed also of two insulating base members 43 and 44, each of them being provided with a recess 45 to receive and inclose my mechanical movement which is here shown as the switch mechanism of the socket. In this form of my invention the driving member 1 is the same in all respects as that shown in Fig. 5. The resilient driven member 46, however, has a somewhat different shape being provided with a body member 47 and two forwardly extending contact arms 48 and 49, and a forwardly extending yoke 50 having an engaging member 51 to directly coöperate with the Z-shaped cam 2 upon the driving member 1. I also, though not necessarily, provide the resilient driven member 46 with an upwardly extending apertured arm 52 preferably formed by bending up a portion of the metal lying between the contact arms 48 and 49 and extend the arm 52 between the arms of the yoke 50. Through the aperture 53 in this arm I pass the cylindrical portion 7 of the driven member 1. This arm 52 coöperating with the head 5 serves to act as a stop to the movement of the driven member 46 in one direction. In this construction the screw shell 54, Fig. 18, is provided with a contact 55, the other coöperating contact 56 being mounted upon the binding post 57, Fig. 17. By rotating the driving member 1, in either direction, the resilient driven member 46 is caused to slide axially of the driving member 1 with a quick snap and to make either a quick make or a quick break, as the case may be, with the contacts 55 and 56. In this construction also similar locking screws 34 and 35 are used to secure the different portions of the insulating base together as well as to secure the binding post and screw shell together.

In some cases instead of forming the insulating base of the socket out of a plurality of elements having their meeting faces in a plane coinciding with the longitudinal axis of the socket, I may in some cases form it out of two insulating members 57 and 58 having their meeting faces at right angles to the longitudinal axis of the socket. The lower insulating base member 58 in such a construction, I provide with a cut away portion 59 and with a locking groove 60 to coöperate with the bead 61 on the screw shell 62, Fig. 14. In this form of my invention the screw shell would be prevented from escaping from the locking groove 60 by means of the cap and shell, not shown in this figure, but which are dotted in Fig. 1, the cap being 63 and the shell 64. As the cap and shell form no part of my invention I have shown them in Fig. 1 simply in dotted lines so as not to confuse the other illustrations. In Fig. 6 they are shown in full lines.

Another portion of my invention comprises a socket provided with indicating mechanism so as to show whether or not the switch is on or off. Frequently when the consuming device is at some distance from the socket it is very desirable to know, without inspecting the consuming device, whether or not the current is passing through it. In other cases it has been found very desirable in practice to know positively whether or not the switch mechanism has been completely turned in the desired direction, either to cut in or out any device to which the socket may be connected.

A portion of my invention includes a socket which at a glance will show whether or not the switch mechanism is on or off. This may be accomplished in various ways. I have shown for example a switch mechanism which positively operates on a half turn of the button or key 32. I mount on the button a pointer 65, Figs. 6 and 7, which will always point either to the word "On" or "Off," which may be stamped, printed, painted or otherwise mounted upon the shell 64. By such an arrangement a mere glance at the socket will instantly determine whether or not the current is passing through some consuming device which may be either not in sight or at some distance from the socket.

Having thus described this invention in connection with several illustrative embodiments thereof to the details of which I do not desire to be limited, what is claimed as new and what it is desired to secure by Letters Patent is set forth in the appended claims:

1. In a mechanical movement, the combination of a driving member provided with an integral bent portion arranged at an angle to the other portion of the driving member and having opposite bearing surfaces, and a resilient driven member adapted to coöperate directly with the said opposite bearing surfaces of the bent portion of the driving member whereby said driven member is moved by said driving member.

2. In a mechanical movement, the combination of a rotary driving member provided with opposed cranks, an inclined member connecting the opposed cranks, a resilient driven member adapted to coöperate directly with the inclined member connecting the opposed cranks to move the driven member.

3. In a mechanical movement, the combination of a rotary driving member provided with a substantially Z-shaped cam, and a resilient driven member adapted to coöperate with the Z-shaped cam.

4. In a mechanical movement, the combination of a driving member provided with opposed cranks, an inclined member provided with recesses connecting the opposed cranks, a resilient driven member adapted to coöperate directly with the inclined member and with the recesses to move the driven member.

5. In a mechanical movement, the combination of a rotary driving member provided with a substantially Z-shaped cam provided with recesses, and a resilient driven member adapted to coöperate with the Z-shaped cam.

6. In a mechanical movement, the combination of a driving member provided with opposed cranks, an inclined member connecting the opposed cranks, a resilient rocking driven member adapted to coöperate with the inclined member connecting the opposed cranks, and a support upon which the driven member rocks.

7. In a mechanical movement the combination of a rotary driving member provided with a substantially Z-shaped cam, a resilient rocking driven member and a support upon which the driven member rocks.

8. An article of manufacture comprising a driving member provided with a substantially Z-shaped cam and extensions on either end of the Z-shaped cam.

9. An article of manufacture comprising a driving member provided with a substantially Z-shaped cam provided with recesses and extensions on either end of the Z-shaped cam.

10. An article of manufacture comprising a driving member provided with an integral substantially Z-shaped cam and provided with integral extensions extending out from the Z-shaped cam.

11. In electric sockets, the combination of a resilient driven member, and a driving member provided with a bent portion adapted to put the resilient driven member under tension, two spaced contacts, said resilient driven member being adapted to directly contact with the bent portion of the driving member to be thereby put under tension and to directly make and break the connection between said contacts to make a quick break or a quick make of the current.

12. In electric sockets, the combination of a resilient rocking driven member, and a driving member provided with a bent portion adapted to put the resilient driven member under tension, two spaced contacts, said resilient rocking driven member being adapted to directly contact with the bent portion of the driving member to be thereby put under tension and to directly make and break the connection between said contacts to make a quick make or a quick break of the current.

13. In electric sockets, the combination of a resilient rocking contact, and a driving member provided with a substantially Z-shaped cam adapted to put the resilient driven member under tension, two spaced contacts, said resilient rocking contact driven member being adapted to directly contact with the substantially Z-shaped cam of the driving member to be thereby put under tension to directly make and break the connection between said contacts to make a quick break or a quick make of the current.

14. In electric sockets, the combination of a base provided with a plurality of parts and locking surfaces carried by the base to coöperate with similar surfaces carried by the screw shell, binding posts, a screw shell provided with locking surfaces to coöperate with those carried by the base, and means to secure the binding posts to the base and at the same time to secure the different sections of the base together and to automatically secure the base to the shell.

15. In electric sockets, the combination of a base formed of two insulating members, each of them provided with a locking groove, a screw shell, a locking surface carried by the screw shell to coöperate with the locking groove, binding posts and two screws for securing the binding post to the insulating base and at the same time to secure the two sections of the base together.

16. In electric sockets, the combination of two insulating base members each of them being provided with a locking groove, a screw shell having a bead to coöperate with the locking groove, two binding posts and two locking screws to secure the binding posts to the base and the different sections of the base together and at the same time to automatically secure the shell to the base.

17. In electric sockets, the combination of two insulating base members each provided with a recess to inclose the switch mechanism and with a locking groove, a switch mechanism mounted within the recess, two binding posts, a screw shell provided with a surface to coöperate with the locking groove, and means to secure at one time the binding posts to the base, the different sections of the base together and the shell to the base.

18. In electric sockets, the combination of an insulating base member provided with a recess for the reception of the switch mechanism and with an extension of the recess for the reception of the pivoting arm of the driven member, a driving member mounted in the insulating base and provided with a substantially Z-shaped cam, a rocking resilient driven member mounted within the insulating base and having a pivoting arm to coöperate with the pivoting recess in the base, a member to directly coöperate with the Z-shaped cam and with two contact arms to coöperate with separate contacts, and two contacts to coöperate with said contact arms upon the rotation of the driven member in either direction to make either a quick make or a quick break of the current.

19. In an electric socket, the combination of two insulating base members having their meeting faces arranged substantially longitudinally of the socket and provided with recesses, a driving member journaled in said recesses, a driven member mounted in said recesses and provided with a substantially Z-shaped cam, a resilient driven member adapted to coöperate with the Z-shaped cam, and electrical contacts adapted to coöperate directly with the resilient driven member.

TONJES AUGUST CARL BOTH.

Witnesses:
 BENJ. STRAUSS,
 LEON STRAUSS.

Copies of this patent may be obtained for five cents each, by addressing the "Commissioner of Patents, Washington, D. C."